United States Patent
Bok et al.

(10) Patent No.: US 12,463,305 B2
(45) Date of Patent: Nov. 4, 2025

(54) PRISMATIC SECONDARY BATTERY HAVING IMPROVED CONNECTION STRUCTURE IN UPPER CASE

(71) Applicant: LG ENERGY SOLUTION, LTD., Seoul (KR)

(72) Inventors: Cheon Hee Bok, Daejeon (KR); Kyung Hwan Jung, Daejeon (KR); Dong Myung Kim, Daejeon (KR); Hyung Joon Jun, Daejeon (KR); Sang Pil Woo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/289,218

(22) PCT Filed: Apr. 4, 2023

(86) PCT No.: PCT/KR2023/004509
§ 371 (c)(1),
(2) Date: Nov. 1, 2023

(87) PCT Pub. No.: WO2023/195732
PCT Pub. Date: Oct. 12, 2023

(65) Prior Publication Data
US 2024/0250392 A1 Jul. 25, 2024

(30) Foreign Application Priority Data
Apr. 5, 2022 (KR) .................. 10-2022-0042009

(51) Int. Cl.
*H01M 50/566* (2021.01)
*H01M 10/04* (2006.01)
(Continued)

(52) U.S. Cl.
CPC ..... *H01M 50/566* (2021.01); *H01M 10/0431* (2013.01); *H01M 50/103* (2021.01);
(Continued)

(58) Field of Classification Search
CPC ............ H01M 50/566; H01M 50/538; H01M 50/3425; H01M 50/103; H01M 50/55;
(Continued)

(56) References Cited

U.S. PATENT DOCUMENTS

2004/0191612 A1 9/2004 Akita et al.
2020/0235370 A1* 7/2020 Chen ................ H01M 10/0431

FOREIGN PATENT DOCUMENTS

CN 102386435 A 3/2012
CN 105684188 A 6/2016
(Continued)

OTHER PUBLICATIONS

KR 20190027673 Search Translation (Year: 2019).*
(Continued)

*Primary Examiner* — Jimmy Vo
(74) *Attorney, Agent, or Firm* — Bryan Cave Leighton Paisner LLP

(57) ABSTRACT

Disclosed herein relates to a prismatic secondary battery including: an electrode assembly including a first electrode lead part formed in a first side direction and a second electrode lead part formed in a second side direction opposite the first side direction; a lower case having an open upper surface and housing the electrode assembly therein; and an upper case covering the open upper surface of the lower case, wherein the upper case includes: a first terminal part bent from a top surface of the upper case corresponding to the open upper surface of the lower case and extending downwardly in the first side direction; and a second terminal part bent from the top surface of the upper case and extending downwardly in the second side direction, wherein the first electrode lead part is electrically connected to the first terminal part, and the second electrode lead part is electrically connected to the second terminal part.

11 Claims, 4 Drawing Sheets

(51) Int. Cl.
*H01M 50/103* (2021.01)
*H01M 50/15* (2021.01)
*H01M 50/169* (2021.01)
*H01M 50/342* (2021.01)
*H01M 50/538* (2021.01)
*H01M 50/55* (2021.01)

(52) U.S. Cl.
CPC ......... *H01M 50/15* (2021.01); *H01M 50/169* (2021.01); *H01M 50/3425* (2021.01); *H01M 50/538* (2021.01); *H01M 50/55* (2021.01)

(58) Field of Classification Search
CPC . H01M 50/15; H01M 50/169; H01M 10/0431
See application file for complete search history.

(56) References Cited

FOREIGN PATENT DOCUMENTS

| | | | |
|---|---|---|---|
| CN | 105917512 A | 8/2016 | |
| CN | 107534110 A | 1/2018 | |
| CN | 111799401 B | 8/2021 | |
| EP | 3270438 A1 | 1/2018 | |
| JP | 2009259651 A | 11/2009 | |
| JP | 2012038603 A | 2/2012 | |
| JP | 2013-105691 A | 5/2013 | |
| JP | 2014-049318 A | 3/2014 | |
| JP | 2014170678 A | 9/2014 | |
| JP | 2015005505 A | 1/2015 | |
| JP | 2015099747 A | 5/2015 | |
| JP | 2015-176782 A | 10/2015 | |
| JP | 2017-084680 A | 5/2017 | |
| JP | 2017139096 A | 8/2017 | |
| JP | 2018-041703 A | 3/2018 | |
| JP | 2018-125238 A | 8/2018 | |
| JP | 6723473 B2 | 7/2020 | |
| JP | 2022-32465 A | 2/2022 | |
| KR | 10-0824898 B1 | 4/2008 | |
| KR | 10-2014-0147660 A | 12/2014 | |
| KR | 10-2015-0050314 A | 5/2015 | |
| KR | 20150050314 A * | 5/2015 | .......... H01M 10/482 |
| KR | 10-2016-0150405 A | 12/2016 | |
| KR | 10-2017-0047687 A | 5/2017 | |
| KR | 10-2018-0101939 A | 9/2018 | |
| KR | 10-2019-0024290 A | 3/2019 | |
| KR | 10-2019-0024292 A | 3/2019 | |
| KR | 10-2019-0027672 A | 3/2019 | |
| KR | 10-2019-0027673 A | 3/2019 | |
| KR | 20190027673 A * | 3/2019 | |
| KR | 10-2019-0048592 A | 5/2019 | |
| KR | 10-2020-0114805 A | 10/2020 | |
| KR | 10-2021-0038029 A | 4/2021 | |
| KR | 10-2021-0147593 A | 12/2021 | |
| KR | 10-2022-0020772 A | 2/2022 | |
| KR | 10-2022-0020774 A | 2/2022 | |

OTHER PUBLICATIONS

KR20150050314 English Translation (Year: 2015).*
International Search Report from PCT/KR2023/004509, dated Jul. 7, 2023.
Written Opinion of the ISA from PCT/KR2023/004509, dated Jul. 7, 2023.
Office Action of Japanese Patent Office for Application No. 2023-567028, dated Aug. 13, 2024.
Extended European Search Report for EP Patent Application No. 23784956.7 dated Nov. 13, 2024.

* cited by examiner

[FIG. 1]
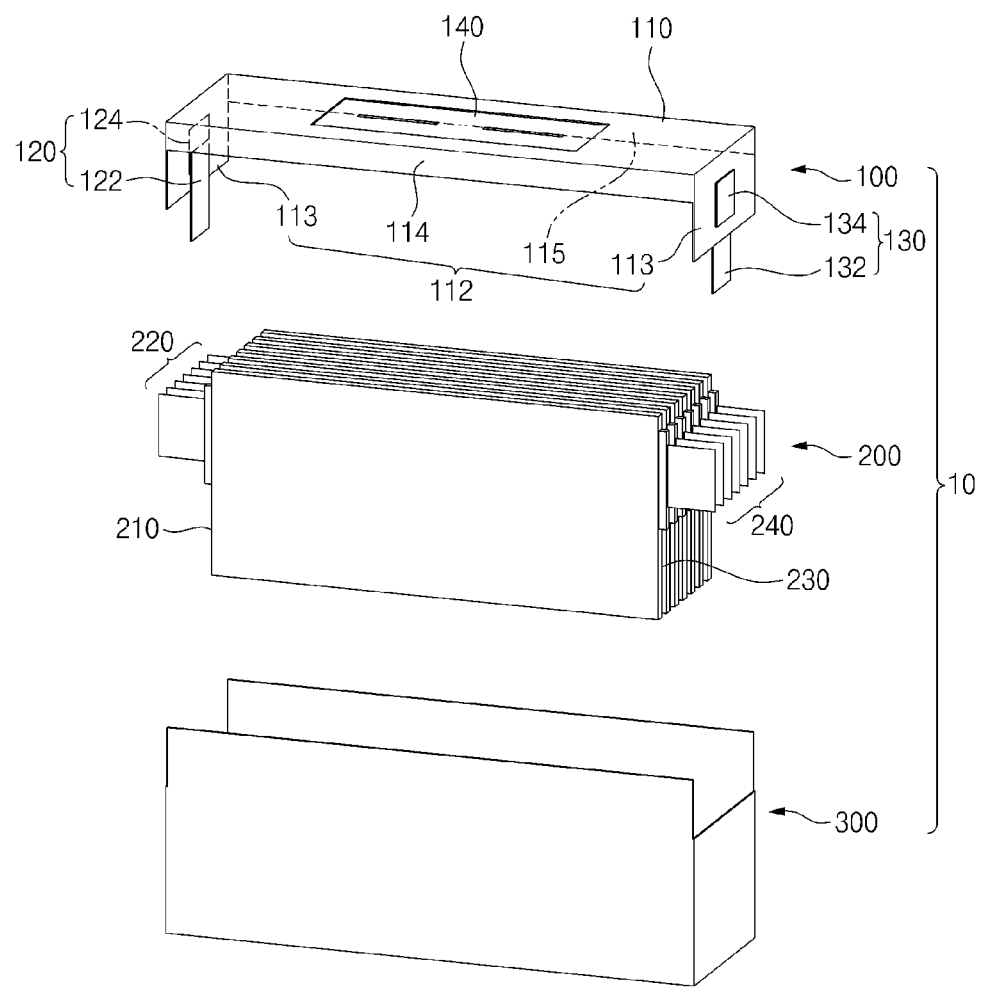

[FIG. 2]
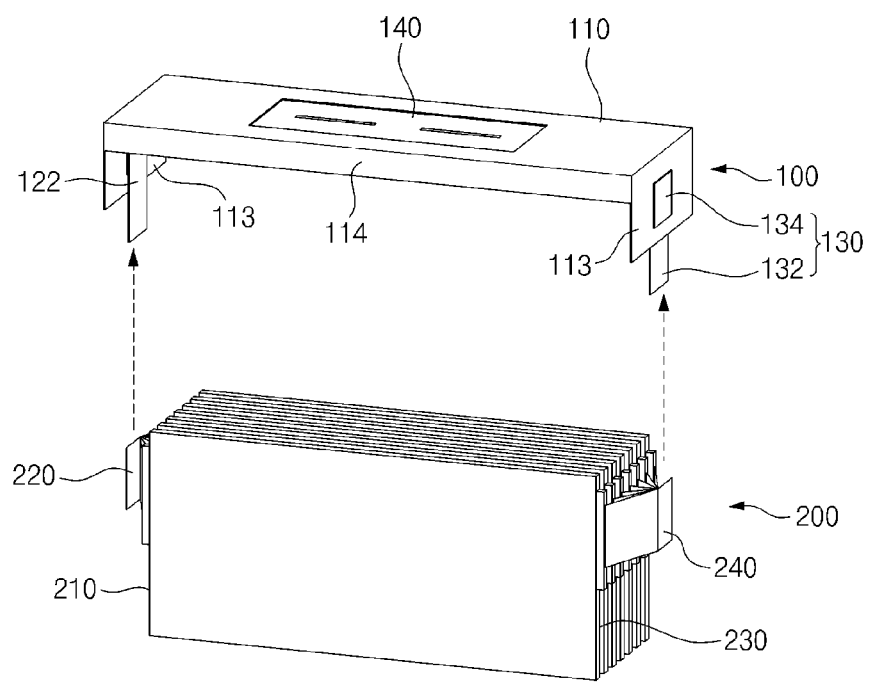

[FIG. 3]
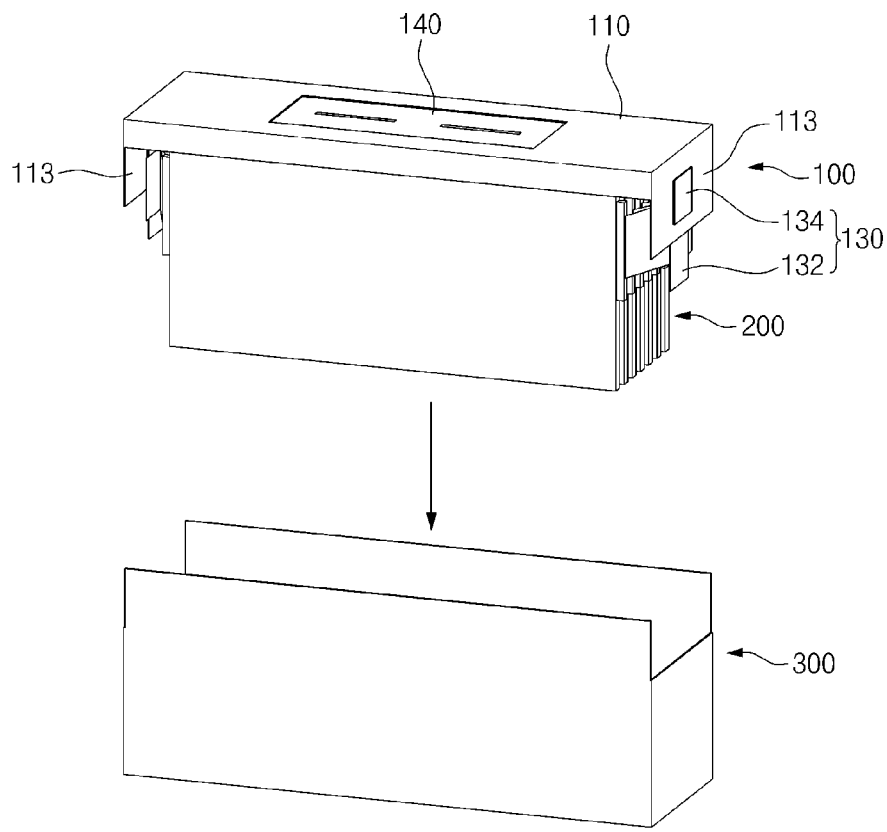
[FIG. 4]
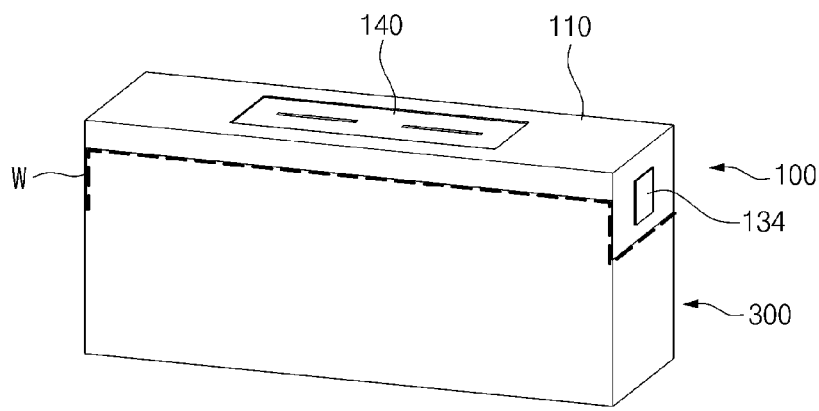

[FIG. 5]
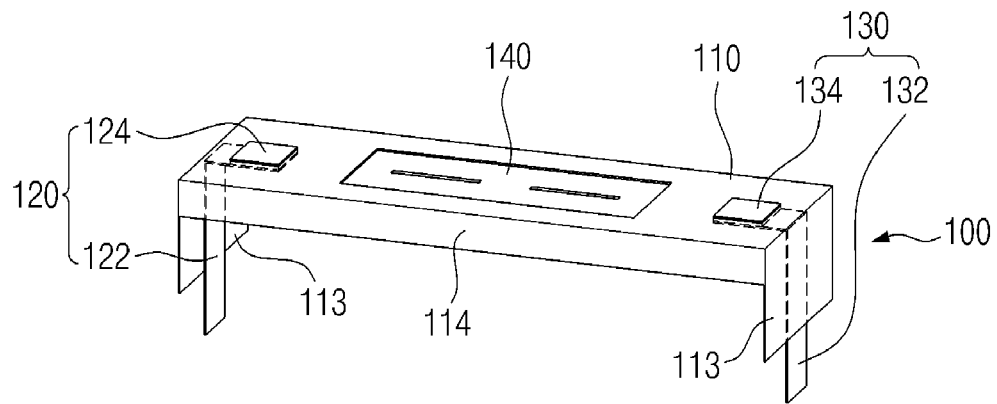
[FIG. 6]
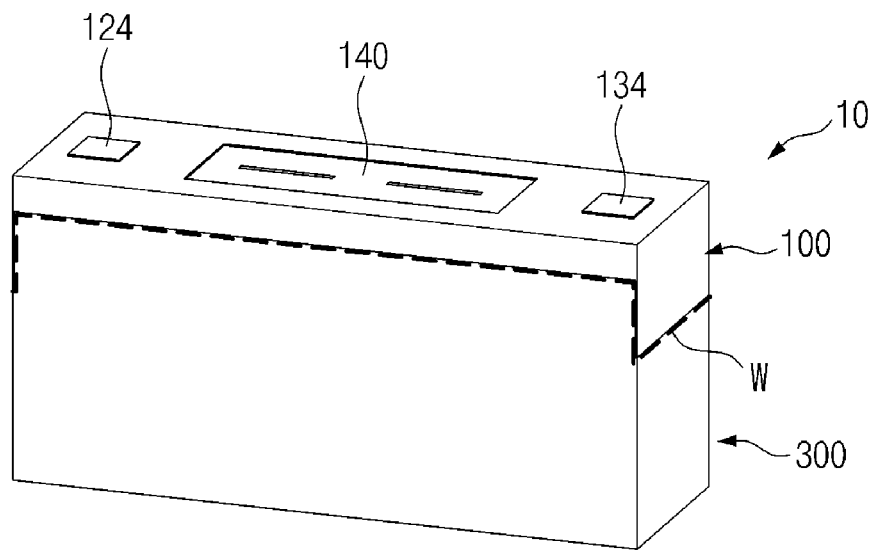

PRISMATIC SECONDARY BATTERY HAVING IMPROVED CONNECTION STRUCTURE IN UPPER CASE

CROSS-REFERENCE TO RELATED APPLICATIONS

This application is a National Phase entry pursuant to 35 U.S.C. § 371 of International Application No. PCT/KR2023/004509, filed on Apr. 4, 2023, and claims the benefit of and priority to Korean Patent Application No. 10-2022-0042009, filed on Apr. 5, 2022, the disclosures of which are incorporated by reference in their entirety for all purposes as if fully set forth herein.

TECHNICAL FIELD

The present technology relates to a prismatic secondary battery, which has an improved connection structure of the positive electrode and negative electrode leads of an electrode assembly to a terminal portion of the secondary battery.

BACKGROUND

Unlike primary batteries, secondary batteries are rechargeable and have been extensively researched and developed recently due to potential for miniaturization and high capacity applications. With the increasing technological advancements and demand for mobile devices, as well as the growing prominence of electric vehicles and energy storage systems in response to environmental concerns, the demand for secondary batteries as an energy source is rapidly and significantly increasing.

Depending on the shape of the battery case, secondary batteries are classified into coin-type batteries, cylindrical batteries, prismatic batteries, and pouch-type batteries. The electrode assembly, which is installed inside the battery case in secondary batteries, is a power generation element capable of charge and discharge. It has a laminated structure of electrodes and separators.

Electrode assemblies can be broadly categorized into three types: a Jellyroll type, which involves winding a positive electrode and a negative electrode of an active material-coated sheet with a separator interposed therebetween; a stack type, where a plurality of positive electrodes and negative electrodes are sequentially stacked with a separator interposed therebetween; and a Stack & Folding type, where the unit cells of the stack type are wound with a long separator film.

Conventionally, when producing large-sized prismatic secondary batteries, the electrode assembly of a bidirectional terminal was inserted into a rectangular case with an open top surface. The positive electrode lead and negative electrode lead on both sides were then drawn out on the top surface and welded to the positive electrode and negative electrode terminals of the cap plate. Finally, the cap plate was welded to the case.

However, in conventional prismatic secondary batteries, the parts that bring the positive and negative electrode leads to the top surface take up space, reducing the capacity of the secondary battery. Moreover, there was also a risk of disconnection at the connecting parts of the positive and negative leads.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

Technical Problem

The present invention aims to improve the connection structure between the positive and negative electrode leads of the electrode assembly and the terminal portion of the secondary battery in a prismatic secondary battery, thereby maximizing the battery's capacity and reducing the risk of disconnection.

However, the technical problems to be solved by the present invention are not limited to the above-described problem, and other problems not mentioned can be clearly understood by those skilled in the art from the following description of the present invention.

Technical Solution

In one example, the prismatic secondary battery according to the present technology includes: an electrode assembly including a first electrode lead part formed in a first side direction and a second electrode lead part formed in a second side direction opposite the first side direction; a lower case having an open upper surface and housing the electrode assembly therein; and an upper case covering the open upper surface of the lower case, wherein the upper case includes: a first terminal part bent from a top surface of the upper case corresponding to the open upper surface of the lower case and extending downwardly in the first side direction; and a second terminal part bent from the top surface of the upper case and extending downwardly in the second side direction, wherein the first electrode lead part is electrically connected to the first terminal part, and the second electrode lead part is electrically connected to the second terminal part.

Furthermore, a gas venting part may be formed on the top surface of the upper case.

In one embodiment of the present invention, the upper case may include a top surface covering the open upper surface of the lower case, and four skirts bent from the top surface and extending downwardly.

Further, among the four skirts, a pair of side skirts on which the first and second terminal parts may be formed extend further downwardly than the other two front and rear skirts.

Additionally, the first and second electrode lead parts of the electrode assembly are positioned upwardly relative to a center height of the electrode assembly.

Further, the first and second terminal parts may include: first and second internal terminals disposed on an inside of the pair of side skirts; and first and second external terminals electrically connected to the first and second internal terminals, respectively, and exposed to an outside of the upper case.

In addition, the first and second electrode lead parts of the electrode assembly may be directly bonded and electrically connected to the first and second internal terminals, respectively.

In one embodiment of the present invention, the first and second external terminals may be positioned on the pair of side skirts, respectively.

Furthermore, according to another embodiment of the present invention, the first and second external terminals may be respectively positioned on the top surface of the upper case.

In addition, the four skirts of the upper case may be welded to the upper surface of the lower case.

In addition, the upper case may be insertionally coupled to the lower case while the first and second electrode lead parts of the electrode assembly are respectively bonded to the first and second terminal parts.

The electrode assembly provided in the prismatic secondary battery of the present invention may be a stack-type electrode assembly or a winding-type electrode assembly.

Advantageous Effects

In the prismatic secondary battery of the present technology, which has the configuration described above, the electrode lead parts of the electrode assembly facing the terminal parts on both sides of the upper case are electrically connected. Accordingly, the parts that bring out the positive and negative electrode leads to the top surface as in conventional prismatic secondary cells are no longer necessary, so the side space of the prismatic secondary cell can be fully utilized, and the capacity of the battery can be additionally secured.

In addition, since the electrode leads of the electrode assembly are directly welded to the terminal parts provided on both sides of the upper case of the prismatic secondary battery of the present invention, the risk of disconnection due to an external impact or the like is significantly reduced.

However, advantageous effects of the present technology are not limited to those mentioned above, and other effects not mentioned will be apparent to one of ordinary skill in the art from the following description of the invention.

BRIEF DESCRIPTION OF THE DRAWINGS

The following drawings accompanying this specification illustrate preferred exemplary embodiments of the present invention and are intended to serve as a further understanding of the technical ideas of the present invention in conjunction with the detailed description of the invention that follows, thereby the present invention is not to be construed as limited to that is described in such drawings.

FIG. 1 is an exploded perspective view of a prismatic secondary battery according to the present invention.

FIG. 2 is a perspective view illustrating the coupling structure between an upper case and an electrode assembly.

FIG. 3 is a diagram illustrating the structure where the combination of an upper case and an electrode assembly is accommodated in a lower case.

FIG. 4 is a diagram illustrating the state where a upper case and a lower case are inter-welded.

FIG. 5 is a diagram illustrating another exemplary embodiment of an upper case.

FIG. 6 is a diagram illustrating the state where the upper case of FIG. 5 is inter-welded with the lower case.

DETAILED DESCRIPTION

The present technology may have various modifications and various examples, and thus specific examples are illustrated in the drawings and described in detail in the description.

However, it should be understood that the present invention is not limited to specific embodiments, and includes all modifications, equivalents or alternatives within the spirit and technical scope of the present invention.

The terms "comprise," "include" and "have" are used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, a film, a region or a plate is disposed "on" another part, this includes not only a case in which one part is disposed "directly on" another part, but a case in which a third part is interposed there between. In contrast, when a part of a layer, a film, a region or a plate is disposed "under" another part, this includes not only a case in which one part is disposed "directly under" another part, but a case in which a third part is interposed there between. In addition, in this application, "on" may include not only a case of disposed on an upper part but also a case of disposed on a lower part.

In one example, the prismatic secondary battery according to the present invention includes an electrode assembly, a lower case, and an upper case.

The electrode assembly includes a first electrode lead part formed in a first side direction and a second electrode lead part formed in a second side direction opposite the first side direction.

In addition, the lower case has a structure in which an upper surface is opened, forming a space inside to accommodate the electrode assembly. The upper case covers the open upper surface of the lower case, and the upper case includes a first terminal part bent from a top surface corresponding to the upper surface of the lower case and extending downwardly in the first side direction; and a second terminal part bent from the top surface and extending downwardly in the second side direction.

Furthermore, the first electrode lead part is electrically connected to the first terminal part, and the second electrode lead part is electrically connected to the second terminal part.

In the prismatic secondary battery of the present invention, having the above-described configuration, the electrode lead parts of the electrode assembly facing the terminal parts on both sides of the upper case are electrically connected. Accordingly, the parts that bring out the positive and negative electrode leads to the top surface as in conventional prismatic secondary cells are no longer necessary, so the side space of the prismatic secondary cell can be fully utilized, and the capacity of the battery can be additionally secured.

Detailed Description of the Preferred Embodiments

Hereinafter, specific embodiments of the present invention will be described in detail with reference to the accompanying drawings.

First Embodiment

FIG. 1 is an exploded perspective view of a prismatic secondary battery 10 according to the present invention. Referring to FIG. 1, the prismatic secondary battery 10 of the present invention includes an electrode assembly 200, a lower case 300, and an upper case 100. The lower case 300 and the upper case 100 are mutually coupled to form a hexahedral shape case of the prismatic secondary battery 10, and the electrode assembly 200 is sized and shaped to be received in the lower case 300 and the upper case 100.

The electrode assembly 200 consists of a plurality of stacked unit cells and includes a first electrode lead part 220 formed in a first side direction 210 and a second electrode lead part 240 formed in a second side direction 230 opposite the first side 210. One of the first and second electrode lead parts 220, 240 serves as the positive electrode lead, while the other serves as the negative electrode lead. If the first electrode lead part is the positive electrode lead, it is formed as a bundle of a plurality of positive electrode tabs formed by punching and molding a positive electrode of each unit cell of the electrode assembly 200. Similarly, the second electrode lead part 240, which is the negative electrode lead, is formed as a bundle of negative electrode tabs.

The prismatic secondary battery 10 of the present invention is applied with a bidirectional electrode assembly 200 where the first electrode lead part 220 and the second electrode lead part 240 are arranged on opposite sides facing each other. With such a structure of the bidirectional electrode assembly 200, the prismatic secondary battery 10 of the present invention can utilize a stack-type electrode assembly, winding-type electrode assembly, or a hybrid type electrode assembly combining the two.

In addition, the lower case 300 has an open upper surface and forms a space inside to accommodate the electrode assembly 200. In correspondence to this, the upper case 100 covers the open upper surface of the lower case 300, and the upper case 100 and the lower case 300 are mutually coupled to seal the interior space.

As illustrated in FIG. 1, the upper case 100 includes a first terminal part 120 bent from a top surface corresponding to the upper surface of the lower case 300 and extending downwardly in the first side direction 210; and a second terminal part 130 bent from the top surface and extending downwardly in the second side direction 230. Accordingly, two terminal parts extending downwardly are disposed on both sides of the upper case 100.

FIG. 2 is a perspective view illustrating the coupling structure between the upper case 100 and the electrode assembly 200. Referring to FIG. 2, the first terminal part 120 of the upper case 100 faces the first electrode lead part 220 of the electrode assembly 200, and similarly, the second terminal part 130 faces the second electrode lead part 240.

Therefore, the first electrode lead part 220 can be electrically connected to the opposing first terminal part 120 very simply by welding, without any additional parts. Similarly, the second electrode lead part 240 is directly welded to the opposing second terminal part 130 for electrical connection.

As such, in the prismatic secondary battery 10) of the present invention, the first and second electrode lead parts 220, 240 of the electrode assembly 200 are directly welded to the first and second terminal parts 120, 130 provided on both sides of the upper case 100. As a result, the risk of disconnection due to external shocks and the like is significantly reduced.

In addition, the top surface of the upper case 100 may have a gas venting part 140. The gas venting part 140 is designed to rupture and release gas in case the internal pressure of the prismatic secondary battery 10 exceeds a certain level. It serves as a safety device to prevent the explosion of the prismatic secondary battery 10. For example, the gas venting part 140 can be designed by forming a thin notch on the surface of the upper case 100, or by attaching a separate venting device.

In one exemplary embodiment of the present invention, the upper case 100 includes a top surface that covers the open upper surface of the lower case 300 and four skirts 112 bent from the top surface and extending downwardly.

In addition, among the four skirts 112, the side skirts 113 on which the first and second terminal parts 120, 130 are formed may extend further downwardly than the other two front and rear skirts 114, 115. By making the front and rear skirts 114, 115 shorter compared to the side skirts 113, it provides access for welding the first and second terminal parts 120, 130 and the first and second electrode leads 220, 240 to each other, facilitating the welding process.

In addition, the first and second electrode leads parts 220, 240 of the electrode assembly 200 can be positioned upwardly relative to a center height of the electrode assembly 200. Correspondingly, the first and second terminal parts 120, 130 of the upper case 100 facing the first and second electrode lead parts 220, 240 are also positioned upwardly relative to the overall height of the prismatic secondary battery 10. This configuration allows for a simpler implementation of a structure in which the first and second terminal parts 120, 130 are disposed more adjacent to the top surface in terms of a bidirectional terminal arrangement of the prismatic secondary battery 10.

Meanwhile, according to an exemplary embodiment of the present invention, the first and second terminal parts 120, 130 may include the first and second internal terminals 122, 132 positioned inside the side skirt 113, as well as the first and second external terminals 124, 134 electrically connected to the first and second internal terminals 122, 132, respectively, and exposed to the outside of the upper case 100.

Only the first and second external terminals 124, 134 are exposed externally, ensuring good sealing of the electrode assembly 200.

Furthermore, the first and second terminal parts 120, 130 are divided into first and second inner terminals 122, 132 that are inwardly coupled to the first and second electrode lead parts 220, 240 of the electrode assembly 200, and first and second outer terminals 124, 134 that are exposed to the outside of the upper case 100, so that greater freedom is provided for positioning the first and second outer terminals 124, 134. In the first embodiment shown in FIGS. 1 to 4, the first and second external terminals 124, 134 are positioned on the side skirt 113.

FIG. 3 is a diagram illustrating a structure in which the combination of an upper case 100 and an electrode assembly 200 is accommodated within a lower case 300. The upper case 100 and the electrode assembly 200 are integrally formed by welding between the first and second terminal parts 120, 130 and the first and second electrode lead parts 220, 240. Thus, the integrally formed upper case 100 and electrode assembly 200 can be easily inserted into the lower case 300.

FIG. 4 is a diagram illustrating the state where the upper case 100 and the lower case 300 are inter-welded. The four skirts 112 of the upper case 100 are welded to the upper surface of the lower case 300. The upper surface of the lower case 300 forms a complementary shape corresponding to the length of the four skirts 112 of the upper case 100 extending downwardly, and a welding part W is formed along the contact surface between the upper case 100 and the lower case 300, ensuring a secure seal for the prismatic secondary battery 10.

Second Embodiment

FIG. 5 is a diagram illustrating a second embodiment of the upper case 100. The second embodiment differs from the first embodiment in the structure of the upper case 100, while the configuration of the electrode assembly 200 and the lower case 300 remains the same as in the first embodiment.

In the second embodiment, the upper case 100 includes a top surface that covers the open upper surface of the lower case 300, and four skirts 112 bent from the top surface and extending downwardly. Among the four skirts 112, the side skirts 113 on which the first and second terminal parts 120, 130 are formed extend further downwardly than the other two front and rear skirts 114, 115.

The first and second terminal parts 120, 130 of the upper case 100 include first and second internal terminals 122, 132 positioned inside the side skirt 113, as well as first and second external terminals 124, 134 electrically connected to the first and second internal terminals 122, 132, respectively, and exposed to the outside of the upper case 100.

Here, in the second embodiment, the first and second external terminals 124, 134 are both positioned on the top surface of the upper case 100, respectively. That is, in the first embodiment, the first and second external terminals 124, 134 are positioned on opposite sides of the upper case 100, while in the second embodiment, they are positioned together on the top surface of the upper case 100.

The second embodiment corresponds to the configuration where the first and second external terminals 124, 134, which are electrically connected to the first and second internal terminals 122, 132, have moved to the top surface of the upper case 100. This arrangement can be easily implemented because the first and second terminal parts 120, 130 of the upper case 200 is divided into first and second internal terminals 122, 132 on the inside that interface with first and second electrode leads 220, 240 of electrode assembly 200, and first and second external terminals 124, 134 that are exposed outside the upper case 100.

In other words, present invention can implement the second embodiment by moving only the first and second external terminals 124, 134 to the top surface of the upper case 100 without changing the coupling structure with the first and second electrode lead part 220, 240 of the electrode assembly 200, and thus it is possible to manufacture the bidirectional secondary battery 10 as a unidirectional secondary battery 10 by changing only the upper case 100.

FIG. 6 shows the state where the upper case 100 of FIG. 5 is welded to the lower case 300. Compared to the first embodiment of FIG. 4, only the positions of the first and second external terminals 124, 134 are different, and all other configurations are the same. Therefore, the present invention has the universality to be applied to both bidirectional secondary battery 10 and unidirectional secondary battery 10, while achieving the same effect of significantly lowering the risk of disconnection due to external impact, etc. while fully utilizing the side space of the prismatic secondary battery 10.

The present invention has been described above in more detail through the drawings and embodiments. However, the configurations described in the drawings or the embodiments in the specification are merely embodiments of the present invention and do not represent all the technical ideas of the present invention. Thus, it is to be understood that there may be various equivalents and variations in place of them at the time of filing the present application.

REFERENCE NUMERALS

10: PRISMATIC SECONDARY BATTERY 100: UPPER CASE
110: TOP SURFACE 112: SKIRT
113: SIDE SKIRT 114: FRONT SKIRT
115: REAR SKIRT 120: FIRST TERMINAL PART
122: FIRST INTERNAL TERMINAL 124: FIRST EXTERNAL TERMINAL
130: SECOND TERMINAL PART 132: SECOND INTERNAL TERMINAL
134: SECOND OUTER TERMINAL 140: GAS VENTING PART
200: ELECTRODE ASSEMBLY 210: FIRST SIDE
220: FIRST ELECTRODE LEAD PART 230: SECOND SIDE
240: SECOND ELECTRODE LEAD PART 300: LOWER CASE
W: WELDING PART

INDUSTRIAL APPLICABILITY

The present invention provides a useful technology for enhancing the capacity and safety of prismatic secondary batteries.

The invention claimed is:

1. A prismatic secondary battery, comprising:
an electrode assembly comprising a first electrode lead part formed in a first side direction and a second electrode lead part formed in a second side direction opposite the first side direction;
a lower case having an open upper surface and partially open surfaces in the first side and the second side, and housing the electrode assembly therein; and
an upper case covering the open upper surface and the partially open surfaces in the first side and the second side of the lower case,
wherein the upper case comprises:
a top surface covering the open upper surface of the lower case;
four skirts including a pair of side skirts bent from the top surface and extending downwardly;
a first terminal part located on one of the side skirts extending downwardly in the first side direction to cover the partially open surface in the first side of the lower case; and
a second terminal part located on another of the side skirts extending downwardly in the second side direction to cover the partially open surface in the second side of the lower case, and
wherein the first electrode lead part is electrically connected to the first terminal part by welding, and the second electrode lead part is electrically connected to the second terminal part by welding.

2. The prismatic secondary battery of claim 1, further comprising:
a gas venting part formed on the top surface of the upper case.

3. The prismatic secondary battery of claim 1, wherein among the four skirts, a pair of side skirts on which the first and second terminal parts are formed extend further downwardly than the other two front and rear skirts.

4. The prismatic secondary battery of claim 3, wherein the first and second electrode lead parts of the electrode assembly are positioned upwardly relative to a center height of the electrode assembly.

5. The prismatic secondary battery of claim 4, wherein the first and second terminal parts comprises:
first and second internal terminals disposed on an inside of the pair of side skirts; and
first and second external terminals electrically connected to the first and second internal terminals, respectively, and exposed to an outside of the upper case.

6. The prismatic secondary battery of claim 5, wherein the first and second electrode lead parts of the electrode assembly are directly bonded and electrically connected to the first and second internal terminals, respectively.

7. The prismatic secondary battery of claim 6, wherein the first and second external terminals are positioned on the pair of side skirts, respectively.

8. The prismatic secondary battery of claim 6, wherein the first and second external terminals are respectively positioned on the top surface of the upper case.

9. The prismatic secondary battery of claim 1, wherein the four skirts of the upper case are welded to the upper surface of the lower case.

10. The prismatic secondary battery of claim 1, wherein the upper case is insertionally coupled to the lower case while the first and second electrode lead parts of the electrode assembly are respectively bonded to the first and second terminal parts.

11. The prismatic secondary battery of claim 1, wherein the electrode assembly is a stack-type electrode assembly or a winding-type electrode assembly.

\* \* \* \* \*